United States Patent
Oag et al.

(10) Patent No.: US 10,336,022 B2
(45) Date of Patent: Jul. 2, 2019

(54) MANUFACTURE OF OPHTHALMIC LENSES

(71) Applicant: CooperVision International Holding Company, LP, St. Michael (BB)

(72) Inventors: Robert Oag, Southampton (GB); Gregg A. Dean; David M. Radcliffe, Southampton (GB); Euan Ferguson, Southampton (GB)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 15/561,988

(22) PCT Filed: May 20, 2016

(86) PCT No.: PCT/GB2016/051462
§ 371 (c)(1),
(2) Date: Sep. 27, 2017

(87) PCT Pub. No.: WO2016/189279
PCT Pub. Date: Dec. 1, 2016

(65) Prior Publication Data
US 2018/0065329 A1    Mar. 8, 2018

Related U.S. Application Data

(60) Provisional application No. 62/165,239, filed on May 22, 2015.

(51) Int. Cl.
*B29D 11/00* (2006.01)
(52) U.S. Cl.
CPC .. *B29D 11/00182* (2013.01); *B29D 11/00067* (2013.01); *B29D 11/00134* (2013.01); *B29D 11/00259* (2013.01)

(58) Field of Classification Search
None
See application file for complete search history.

(56) References Cited

U.S. PATENT DOCUMENTS

| | | | | |
|---|---|---|---|---|
| 4,640,489 A | * | 2/1987 | Larsen | B29D 11/00057 249/122 |
| 5,080,839 A | * | 1/1992 | Kindt-Larsen | B29D 11/00067 206/5.1 |

(Continued)

FOREIGN PATENT DOCUMENTS

WO    2015073060 A1    5/2015

OTHER PUBLICATIONS

"Mold Polishing Tips for Injection Molds" https://www.improve-your-injection-molding.com/mold-polishing.html, wayback machine date Apr. 2015, 2 pages (Year: 2015).*

(Continued)

*Primary Examiner* — Lisa L Herring
(74) *Attorney, Agent, or Firm* — Kilyk & Bowersox, P.L.L.C.

(57) ABSTRACT

A method of manufacturing an ophthalmic lens using a first mold portion and a puck assembly. The puck assembly comprises a carrier puck. The puck assembly supports at least one of the first mold portion and the lens during at least two of the following ophthalmic lens manufacturing steps: assembling the first mold portion and a second mold portion into a mold assembly including a lens-defining cavity containing a lens precursor material; curing the lens precursor material in the mold assembly to form a lens; separating the mold assembly such that the lens remains attached to the first mold portion; detaching the lens from the first mold portion; extracting unwanted material from the lens; hydrating the lens; inspecting the lens, and packaging the lens.

13 Claims, 11 Drawing Sheets

(56) References Cited

U.S. PATENT DOCUMENTS

| | | | |
|---|---|---|---|
| 6,012,471 A * | 1/2000 | Calvin | B29C 31/00 134/58 R |
| 6,113,817 A | 9/2000 | Herbrechtsmeier et al. | |
| 6,311,967 B1 | 11/2001 | Bickert | |
| 2005/0136147 A1 | 6/2005 | Yang et al. | |
| 2007/0023942 A1 | 2/2007 | Andino et al. | |
| 2011/0101552 A1 | 5/2011 | Cocora et al. | |
| 2013/0161846 A1 | 6/2013 | Goodenough et al. | |
| 2015/0239186 A1 * | 8/2015 | Van Dijk | B29D 11/00182 264/2.5 |

OTHER PUBLICATIONS

Noble et al., "Rapid tooling injection molded prototypes: a case study in artificial photosynthesis technology", Procedia CIRP 14 (2014), pp. 251-256. (Year: 2014).*
International Search Report and Written Opinion issued in corresponding International Patent Application No. PCT/GB2016/051462 dated Aug. 25, 2016 (13 pages).
Demand filed Mar. 6, 2017 in corresponding International Patent Application No. PCT/GB2016/051462 (17 pages).
International Preliminary Report on Patentability issued in corresponding International Patent Application No. PCT/GB2016/051462 dated Jun. 1, 2017 (20 pages).

* cited by examiner

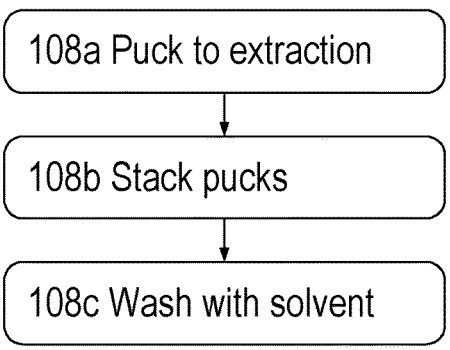
Fig. 16
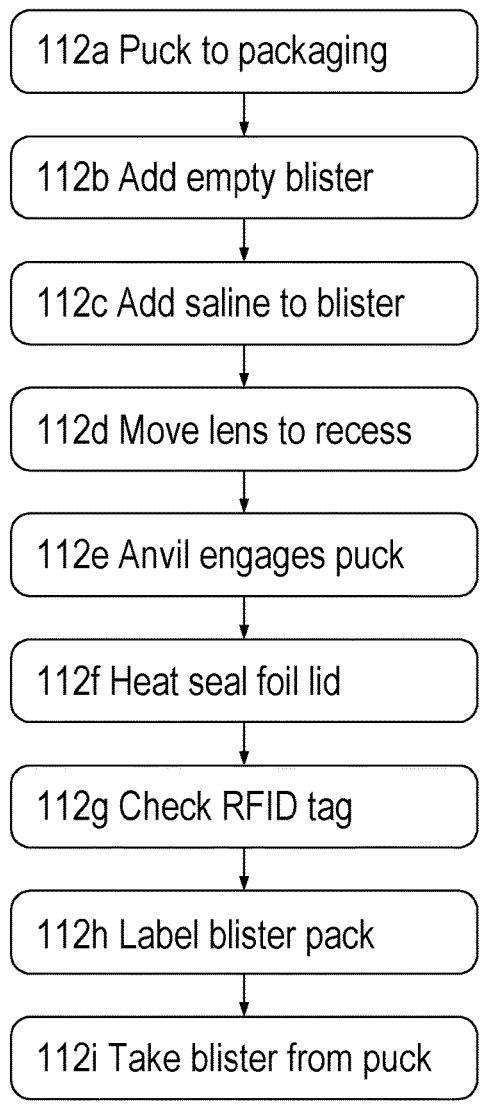
Fig. 17
Fig. 18

MANUFACTURE OF OPHTHALMIC LENSES

This application is a National Stage Application of PCT/GB2016/051462, filed May 20, 2016, which claims the benefit under 35 U.S.C. § 119(e) of prior U.S. Provisional Patent Application No. 62/165,239, filed May 22, 2015.

TECHNICAL FIELD

The present invention concerns improvements in and relating to the manufacture of ophthalmic lenses. More particularly, the present invention concerns methods and apparatus for manufacturing made to order (MTO) ophthalmic lenses, in particular MTO contact lenses.

BACKGROUND OF THE INVENTION

Made to Order (MTO) lenses are produced in very small batch sizes, or as a one-off for a specific patient or a relatively small group of patients. Generally speaking, MTO lenses are lenses for non-standard prescriptions where low demand renders standard commercial batch sizes uneconomic. The very small batch size renders some methods and apparatus of manufacture associated with producing large batch sizes inappropriate. Moreover, as a result of the small batch size several batches of MTO lenses, each batch having different characteristics, will typically be in-process on the same production line at the same time. Maintaining batch integrity therefore becomes a key consideration for MTO lenses.

US Patent Application Publication No. 2010/0109176 discloses the use of machined lens molds in producing MTO lenses. The method disclosed in this application involves forming a plastic ophthalmic lens mold portion blank from a plastic material, and removing a portion of the mold portion blank to form a lens-defining surface having a radius of curvature corresponding to a back surface or a front surface of a lens produced using the lens mold portion. Such machined mold portions may be particularly useful in the manufacture of MTO lenses.

It is desirable to improve the efficiency of the manufacturing process used with MTO mold portions, particularly machined MTO mold portions.

SUMMARY OF THE INVENTION

According to a first aspect of the invention, there is provided a method of manufacturing an ophthalmic lens using a first mold portion and a puck assembly, said puck assembly comprising a carrier puck, and characterised in that the puck assembly supports at least one of the first mold portion and the lens during at least two of the following ophthalmic lens manufacturing steps:
  a. assembling the first mold portion and a second mold portion into a mold assembly including a lens-defining cavity containing a lens precursor material;
  b. curing the lens precursor material in the mold assembly to form a lens;
  c. separating the mold assembly such that the lens remains attached to the first mold portion;
  d. detaching the lens from the first mold portion;
  e. extracting unwanted material from the lens;
  f. hydrating the lens;
  g. inspecting the lens;
  h. packaging the lens;

According to a second aspect of the invention, there is provided a carrier puck suitable for use as the carrier puck of the first aspect.

According to a third aspect of the invention, there is provided a puck set including a carrier puck and a plurality of step-specific puck elements wherein the carrier puck is arranged and configured to interface with a first step-specific puck element and a second, different, step-specific puck element such that, in use, the first step-specific puck element interacts with a first mold portion and/or a lens produced using the mold portion and carried by the carrier puck during a first ophthalmic lens manufacturing step and then the second step-specific puck element interacts with the mold portion and/or the lens carried by the puck during a second ophthalmic lens manufacturing step.

According to a fourth aspect of the invention, there is provided a production line for producing made to order ophthalmic lenses including at least two of the following ophthalmic lens manufacturing stations:
  a. A mold assembly station
  b. A curing station
  c. A demolding station
  d. A delensing station
  e. A hydrating station
  f. An extraction station
  g. An inspection station
  h. A packaging station
wherein a single carrier puck is used to transfer a mold portion and/or lens produced using the mold portion between the at least two manufacturing stations.

Any features described herein with reference to any aspect of the disclosure are equally applicable to any other aspect of the disclosure.

DESCRIPTION OF THE DRAWINGS

Various embodiments of the invention will now be described.

FIG. 16 is a flow chart of the extraction step, in accordance with the process shown in FIG. 1, in more detail.

FIG. 17 is a flow chart of the hydration step, in accordance with the process shown in FIG. 1, in more detail.

FIG. 18 is a flow chart of the packaging step, in accordance with the process shown in FIG. 1, in more detail.

DETAILED DESCRIPTION

Figure 1:
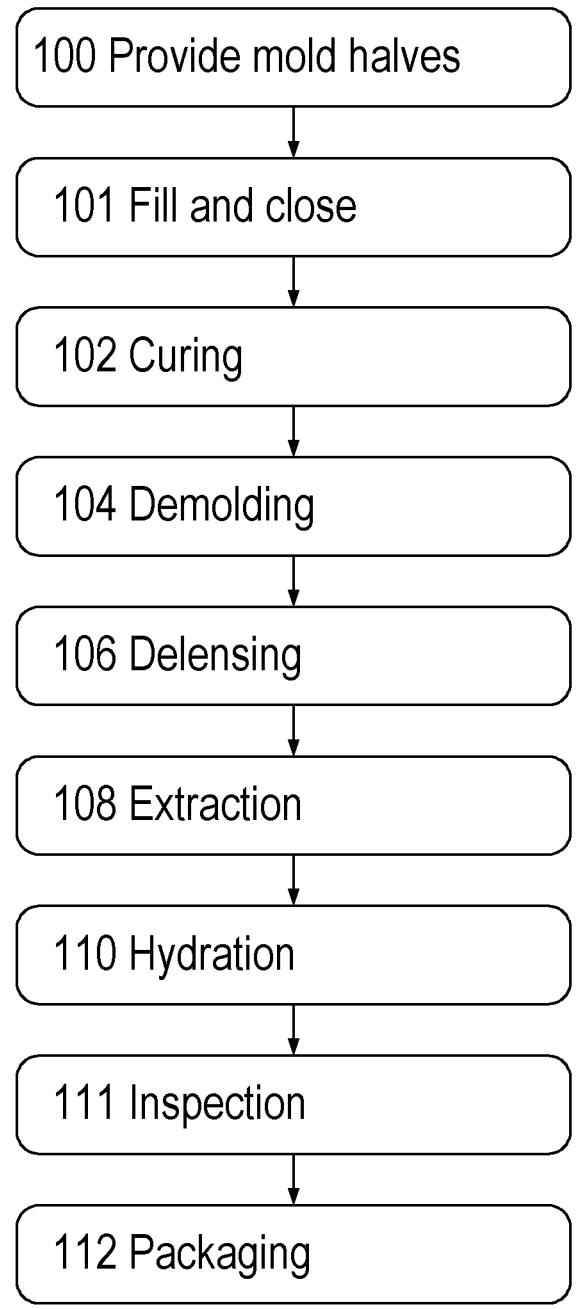
FIG. 1 is an overview flow chart of a manufacturing process for producing a MTO contact lens in accordance with an example method of the present invention.

According to a first aspect of the invention there is provided a method of manufacturing an ophthalmic lens using a first mold portion and a puck assembly. The puck assembly comprises a carrier puck. The puck assembly supports at least one of the first mold portion and the lens during at least two of the following ophthalmic lens manufacturing steps:
  a. assembling the first mold portion and a second mold portion into a mold assembly including a lens-defining cavity containing a lens precursor material;
  b. curing the lens precursor material in the mold assembly to form a lens;
  c. separating the mold assembly such that the lens remains attached to the first mold portion;
  d. detaching the lens from the first mold portion;
  e. extracting unwanted material from the lens;
  f. hydrating the lens;
  g. inspecting the lens;
  h. packaging the lens;

The puck assembly can support at least one of the first mold portion and the lens during at least three of the ophthalmic lens manufacturing steps a. to h. The puck assembly can support at least one of the first mold portion and the lens during the majority of the ophthalmic lens manufacturing steps a. to h. The puck assembly can support at least one of the first mold portion and the lens during all of the ophthalmic lens manufacturing steps a. to h. The method can include other ophthalmic lens manufacturing steps in addition to steps a to h; for example, the method can involve further, intermediate, manufacturing steps.

It will be understood that the manufacturing process described above uses the first mold portion in the production of an ophthalmic lens. Whether the puck assembly supports (i) the first mold portion, (ii) a lens produced using the first mold portion or (iii) both the first mold portion and the lens, during any given manufacturing step will be a function of the stage in the manufacturing process that has been reached. At least one of the first mold portion or the lens is with the puck assembly at any given stage of the manufacturing process which assists in maintaining batch integrity.

The lens is produced using the first mold portion by curing and/or polymerizing a lens precursor material contained within a lens-shaped cavity formed at least in part by the first mold portion.

The puck assembly can support a mold portion and/or lens by constraining the movement of said mold portion and/or lens in one or more directions. It can be that the puck assembly is arranged and configured to support a first mold portion and a lens manufactured using the first mold portion both separately and together during different stages of the manufacturing process described above. That is to say, the puck assembly can be arranged and configured to support the first mold portion and the lens manufactured using a first mold portion at the same time, as well as the mold portion when the lens is not present and the lens when the mold portion is not present.

The puck assembly can be or include a carrier puck. The carrier puck can be arranged and configured to support both a mold portion and a lens at the same time, as well as a mold portion when a lens is not present and a lens when a mold portion is not present. That is to say, the carrier puck can be arranged and configured to support a mold portion and a lens both separately and together. It can be that the carrier puck is arranged and configured to interact with a plurality of step-specific puck elements.

The puck assembly can also comprise one or more step-specific puck elements. Each step-specific puck element can be arranged and configured to support a mold portion and/or lens during a specific ophthalmic lens manufacturing step. The components which constitute the puck assembly can change during the manufacturing process. It can be that the puck assembly includes the same carrier puck for the duration of the manufacturing process. It can be that a different step-specific puck element is used with the carrier puck to form the puck assembly for different manufacturing steps. Thus, it can be that the puck assembly includes the same carrier puck for the duration of the manufacturing process, but the puck assembly can be reconfigured during the ophthalmic lens manufacturing process by providing a different step-specific puck element for each manufacturing step. It will be understood that a lens does not have to be in direct contact with the carrier puck in order to be supported by the carrier puck. For example, a lens can be supported by a liquid contained in a recess of the carrier puck, in which case the lens may not be in direct contact with the carrier puck structure.

The ophthalmic lens can be a cast molded lens. The ophthalmic lens can be a corneal inlay. The ophthalmic lens can be a corneal onlay. The ophthalmic lens can be an intraocular lens. The ophthalmic lens can be a contact lens.

Contact lenses applicable to the invention can be hydrogel lenses, for example lenses made of a silicone hydrogel material. Such contact lenses can be extended wear silicone hydrogel contact lenses and/or daily wear silicone hydrogel contact lenses.

The first mold portion can be a machined mold portion. A machined mold portion can be defined as a mold portion produced by removing material from a lens mold portion blank to form a lens-defining surface. It will be understood that the material may be removed by a wide variety of processes, for example using a lathe, a laser, or other material removal process. The method may include a step of removing material from a lens mold portion blank to form the lens-defining surface of the first mold portion.

A machined mold portion can have a machined concave lens-shaped region that defines an anterior surface of the lens. A machined mold portion can have a machined convex lens-shaped region that defines a posterior surface of the lens. A machined mold portion can include one machined lens-defining surface and one molded lens-defining surface. A molded lens-defining surface can be defined as a surface having a profile produced by molding, for example injection molding. A machined mold portion can have two machined lens-defining surfaces, one on each side of the mold.

The first mold portion may be a cast mold portion. A molded mold portion may be defined as a cast portion where all of the lens-defining surfaces are cast molded lens-defining surfaces.

The step of assembling the first mold portion and a second mold portion into a mold assembly including a lens-defining cavity containing a lens precursor material can be referred to as the fill-and-close step. The second mold portion can be a machined mold portion. The second mold portion can be a cast mold portion. The fill-and-close step can include providing a lens precursor material in the lens-shaped cavity. The lens precursor material can be provided on one of the mold portions prior to assembly of the mold assembly. The lens precursor material can be provided on a surface of the first mold portion. The lens precursor material can be provided on a convex lens-defining surface. The fill-and-close step can include aligning the mold portions. The mold portions can by placed in contact with each other to form a lens-shaped cavity with the lens precursor material contained therein. The fill-and-close step can include coupling the mold portions together. The mold portions can be coupled using an interference fit. The mold portions can by coupled by fusing regions of the mold portions together.

The step of curing and/or polymerizing the lens precursor material can include exposing the mold assembly to ultra violet light. The step of curing and/or polymerizing the lens precursor material can include heating the mold assembly. The step of curing and/or polymerizing the lens precursor material can include passing the mold assembly through a curing oven.

The step of separating the mold assembly such that the lens remains attached to the first mold portion can be referred to as a demolding step. The demolding step can involve moving the mold assembly relative to one or more mechanical separation devices. The mechanical separation device can be a wedge. The mechanical separation device can separate the mold portions by prying the mold portions apart. The mechanical separation device can be a blade. The mechanical separation device can be a spinning blade. The mechanical separation device can separate the mold portions by cutting.

The step of detaching the lens from the first mold portion can be referred to as a delensing step. The delensing step can involve immersing a puck assembly supporting a mold portion and/or a lens in a liquid. The delensing step can involve immersing a carrier puck supporting a mold portion carrying a lens in a liquid. The lens can be detached from the mold portion as a result of the liquid swelling the lens such that the shape and/or size of the lens changes. Alternatively or additionally, the liquid can dissolve the mold portion while leaving the lens intact. Thus, the delensing step can comprise dissolving the first mold portion.

The step of extracting unwanted material from the lens can be referred to as an extraction step. Unwanted material can include unreacted lens precursor material, for example unreacted monomer. The extraction step can involve passing a liquid, for example a solvent, over the lens. The extraction step can involve immersing a puck assembly supporting a lens in the liquid. The extraction step can involve immersing a carrier puck supporting a lens in the liquid.

The step of hydrating the lens can be referred to as a hydrating step. The hydrating step can involve passing a liquid, for example water, over the lens. The hydrating step can involve immersing a puck assembly supporting a lens in the liquid. The hydrating step can involve immersing a carrier puck supporting a lens in the liquid.

The step of inspecting the lens can be referred to as an inspection step. The inspection step can comprise an inspection for defects in the lens. The inspection step can comprise an inspection of the cosmetic appearance of the lens.

The step of packaging the lens can be referred to as a packaging step. The packaging step can involve providing a blister. The packaging step can involve placing the lens in a recess of the blister. The packaging step can involve providing a packaging solution in the recess. The packaging step can involve dispensing packaging saline into the recess of the blister. The packaging step can involve providing a foil lid. The packaging step can involve sealing the foil lid to the blister to form a blister pack. The foil lid can be heat sealed to the blister pack. The packaging step can involve labelling the blister pack with one or more identifying numbers.

The lens can be of a non-hydrated and/or non-fluid-swollen lens type. In such a case, it can be that the method does not include a hydration step.

The mold portions can comprise polymeric materials. For example, the mold portions can comprise thermoplastic polymeric materials, in particular amorphous polymeric materials. The mold portions can comprise materials such as polystyrene, polycarbonate, acrylonitrile/butadiene/syrene compositions, cyclic olefin co-polymers, acrylics and/or polysulfone. The mold portions can comprise semicrystalline resins such as acetal, polypropylene, polyethylene, nylon, polyethylene terephalate, polyether ether keton, other polyolefins and liquid crystal polymers. The mold portions can comprise polyethylene vinyl alcohol (EVOH) for example injection molded EVOH. The mold portions can comprise vinyl alcohol resins, for example amorphous vinyl alcohol resins such as Nichigo G-Polymerm available from Nippon Gohsei Europe GmbH. It will be understood that the lens mold portion blanks will be the same material as the lens mold portions.

The lens precursor material can be a polymerizable composition. The lens precursor material can be a monomer mixture. The precursor material can include a silicone containing monomeric component.

Each mold portion can include a lens-shaped region. Each lens-shaped region can include a surface which defines a surface of the lens. It can be that each lens-defining surface has a radius of curvature corresponding to a back surface or a front surface of a lens produced using the mold portion. Each mold portion can include a flange region circumscribing the lens shaped region. It can be that one of the mold portions has a convex lens-shaped region that defines a posterior surface of the lens. Such a mold portion can be referred to as a male mold portion. It can be that one of the mold portions has a concave lens-shaped region that defines an anterior surface of the lens. Such a mold portion can be referred to as a female mold portion. It can be that the mold portions are "universal" mold portions. A universal mold portion can be defined as a mold portion that has both a convex lens-shaped region on a first side and a concave lens-shaped region on as second, opposite, side. The mold portions can be configured such that when placed together the lens-shaped regions of the mold portions form a lens-shaped cavity. The mold portions can be configured such that when placed together one or more regions of the surface of the flanges of the assembled mold sections are in contact with one another.

The mold portion can be a pan-handle mold portion. A pan-handle mold portion can include a head and a handle. The head can be substantially circular when viewed in plan. The head can include the lens-shaped region and flanges.

The handle can be in the form of an elongate member extending radially from a location on the circumference of the head. Pan-handle mold portions can be assembled to form a pan-handle mold assembly.

The handle of a first pan-handle mold can include a projection extending perpendicular to the longitudinal axis of the handle. The projection may extend away from the second mold portion when the first and second mold portions are assembled into a mold assembly. The projection may extend towards the second mold portion when the first and second mold portions are assembled into a mold assembly. It can be that the projection is arranged and configured to contact the handle of another pan-handle mold, for example the second mold portion or another mold portion that forms part of a second mold assembly. In use, the projection on the handle of the first mold can contact the handle of the second mold portion such that the handles of the two mold portions are substantially parallel when the mold portions are put together to form the mold assembly. Thus, the projection can assist in ensuring the two mold portions are correctly aligned during assembly and therefore can reduce the risk of defects occurring during the coupling of the mold portions. In use, the projection on the handle of the first mold can contact another mold portion, for example a mold portion forming part of a second mold assembly such that the handles of the two mold portions are substantially parallel when the first and second mold assemblies are stacked together. Thus, the projection can assist in maintaining the stability of a stack of mold assemblies.

A mold portion, for example the female mold portion, can include a tab. The tab can extend radially from a location on the circumferential flange of the mold portion. The radial extent of the tab can be very much less than the radial extent of a handle, if present. The location of the tab on the flange of the mold portion can be at 180 degrees to the location of the handle, if present. In use the tab can be located in a corresponding recess in the surface of the carrier puck.

The method can comprise a step of providing an identifying element. The identifying element can include information in a plain text form. The identifying element can include information in a machine-readable form. The identifying element can be a Radio Frequency Identity (RFID) tag.

The identifying element can include information relating to a lens to be manufactured. The information can include a batch number. The information can include a lens profile.

The identifying element can be supported by a carrier puck. The carrier puck can support the identifying element for all of the ophthalmic lens manufacturing steps in which the puck assembly supports at least one of the first mold portion and the lens. Thus, the method can comprise a step of providing an identifying element and the carrier puck carries the identifying element in all of the ophthalmic lens manufacturing steps of the method.

Including an identifying element in the carrier puck of a puck assembly allows the lens and/or mold portion associated with the puck assembly to be tracked throughout the manufacturing process and therefore assists in maintaining batch integrity.

The method can include a step of reading the identifying element to identify the mold portion and/or lens. The method can include a step of selecting a process or a process parameter based upon the identity of the mold portion and/or lens. The method can include a step of using a database or other look-up table to select a process parameter based upon the identity of the mold portion and/or lens. The method can comprise a step of reading the identifying element and selecting a process or a process parameter based upon the identity of the mold and/or lens. For example, the identifying element can be read to determine the volume of lens precursor material to be dispensed during the fill-and-close step. The identifying element can be read to determine the information to be printed on a label during the packaging step.

The carrier puck can be a substantially planar member. In use, the mold portion and/or lens can be supported by a first surface on a first side of the carrier puck. The first surface can include a recess arranged to support a portion of the mold and/or lens. It can be that the recess is arranged and configured to receive a portion of a mold portion, for example a tab, a handle, the head, the flanges and/or the surface of the mold portion opposite to that which includes the lens-defining surface. For example, the recess can be arranged to receive a portion of a convex rear surface of female mold portion. The recess can be in the form of a hole which extends from the first side of the carrier puck to the second, opposite side of the carrier puck (i.e. a hole which passes through the carrier puck). Additionally or alternatively the recess can be in the form of a depression in the surface of the carrier puck. Where the surface of the carrier puck contains a recess arranged and configured to receive at least a portion of the mold portion, the mold portion can be supported by a region of the first surface surrounding the recess. It will be understood that as a mold portion forms part of a mold assembly the same recess can be used to support the mold portion separately or when it forms part of a mold assembly.

It can be that the carrier puck is arranged and configured to support a second mold portion. It can be that the carrier puck is arranged and configured to support the second mold portion separately and when assembled to form a mold assembly. Thus, the carrier puck can support both mold portions involved in the manufacture of an ophthalmic lens. It can be that the carrier puck includes a second recess for supporting the second mold portion. For example, the carrier puck can include a second recess for supporting a male mold portion. The carrier puck being able to support both (or all) of the mold portions involved in the manufacture of the ophthalmic lens can be advantageous in maintaining batch integrity.

The first mold portion can be a female mold portion. Thus, it can be that the carrier puck is arranged and configured to support a first mold portion that is a female mold portion. It can be that the carrier puck includes a recess for supporting the female mold portion. The second mold portion can be a male mold portion. Thus, it can be that the carrier puck is arranged and configured to support a second mold portion that is a male mold portion.

It can be that the carrier puck is arranged and configured to interface with a plurality of different step-specific puck elements. Thus, the method can include the following steps;
  a. providing a first step-specific puck element;
  b. combining the first step-specific puck element with the carrier puck and carrying out a first ophthalmic lens manufacturing step on the mold portion and/or the lens carried by the carrier puck; and then
  c. providing a second step-specific puck element;
  d. combining the second step-specific puck element with the carrier puck and carrying out a second ophthalmic lens manufacturing step on the mold and/or the lens carried by the carrier puck.

The method can comprise providing a third step-specific puck element, combining the third step-specific puck element with the carrier puck, and carrying out a third ophthalmic lens manufacturing step on the mold and/or the lens carried by the carrier puck.

The method can comprise providing a further step-specific puck element, combining the further step-specific puck element with the carrier puck, and carrying out a further ophthalmic lens manufacturing step on the mold and/or the lens carried by the carrier puck.

Use of the step-specific puck elements allows the puck assembly to be reconfigured for each manufacturing step. Thus, the same carrier puck can be used in a plurality of different manufacturing steps thereby assisting in maintaining batch integrity.

Each step-specific puck element can include step-specific features arranged and configured to assist in the manufacture of an ophthalmic lens using a first mold portion. It can be that each step-specific puck element is arranged and configured to interface with the carrier puck. It can be that the step-specific features are arranged and configured to interact with a mold portion and/or lens during a manufacturing step when the step-specific element is combined with the carrier puck to form a puck, assembly.

It can be that each step-specific puck element includes a substantially planar base portion. It can be that each step-specific puck element includes alignment means. The alignment means can be arranged and configured to locate the step-specific puck element relative to the carrier puck. The alignment means can be a pin.

The carrier puck can include one or more recesses arranged and configured to receive at least a portion of the step-specific puck element. The carrier puck can include one or more recesses arranged and configured to receive the step-specific features of the step-specific puck element. It can be that the carrier puck recess is arranged and configured to receive at least a portion of the step-specific puck element and at least a portion of the first mold portion and/or lens. Thus, the step-specific features of a puck element can interact with the mold portion and/or the lens carried by the carrier puck. The step-specific puck element can interact with the first mold portion and/or lens via the carrier puck. For example, the step-specific puck element can interact with the first mold portion and/or lens via a hole in the carrier puck. When combined in the puck assembly, the step-specific puck element can be located on the opposite side of the carrier puck to the mold portion and/or lens. For example, the step-specific puck element can be located at the bottom side of the carrier puck and the mold portion and/or lens can be located at the top side of the carrier puck.

The carrier puck can include a hydration dish. The hydration dish can comprise a recess formed in the surface of the carrier puck. The surface of the hydration dish recess can include a plurality of holes that pass through the carrier puck. The hydration dish can support a lens during a manufacturing step. Thus, the hydration dish can allow the carrier puck to support the lens whilst still allowing liquid to flow over the lens. The carrier puck can include a plurality of channels extending from the edge of the hydration dish to the edge of the puck. Such channels can increase fluid flow over the lens, particularly if a plurality of carrier pucks are stacked together.

The carrier puck can be formed using an additive manufacturing process. The step-specific puck elements can be produced using an additive manufacturing process, for example 3D printing. The puck assembly can be produced using an additive manufacturing process. Using additive manufacturing process in the production of the puck set and/or the constituent elements thereof can give a greater degree of design freedom than conventional manufacturing processes and can therefore assist in improving the utility of the puck set.

It can be that a first type of step-specific puck element is arranged and configured to support the flanges of the first mold portion when the step-specific puck element is combined with the carrier puck. For example, the step-specific puck element can include a recess arranged and configured to receive a portion of the mold portion such that when the step-specific element is combined with the carrier puck the flanges of the mold portion are supported by the surface of the step-specific element in the region of the edge of the recess. As discussed above, the fill-and-close step can include coupling the mold portions together. It can be that a step-specific puck element is arranged and configured to support the flanges of the first mold portion during the coupling process. It can be that the first step-specific puck element is arranged and configured to support the flanges of the first mold portion and the first manufacturing step can comprise assembling the first mold portion and a second mold portion into a mold assembly.

Use of such a step-specific puck element can reduce flexing of the mold assembly during the coupling process and therefore ensure the mold portions are correctly aligned.

It can be that a second type of step-specific puck element is arranged and configured to displace the mold assembly relative to the surface of the carrier puck when combined with the carrier puck. The step-specific puck element can be arranged and configured to displace the mold assembly away from the surface of the carrier puck. As discussed above the demolding step can involve moving the mold assembly relative to one or more mechanical separation devices. It can be that a step-specific puck element is arranged and configured to displace the mold assembly away from the surface of the carrier puck and the corresponding manufacturing step can comprise separating the mold assembly such that the lens remains attached to the first mold portion. Thus, the step-specific puck element can lift the mold assembly clear of the carrier puck such that the mechanical separation devices can separate the mold assembly whilst avoiding damage to the carrier puck. Lifting the mold assembly during the demolding step can also reduce the risk of damaging the (reusable) carrier puck. The step-specific element can include one or more locating elements arranged and configured to prevent movement of the mold assembly when the mold assembly is contacted by the mechanical separation elements.

A third type of step-specific puck element can include a retaining wall arranged and configured to limit movement of the lens relative to the mold portion and/or the carrier puck when the step-specific element is combined with the carrier puck during a manufacturing step. The step-specific puck element can comprise a retaining wall arranged and configured to retain the lens in proximity to the first mold portion and the corresponding manufacturing step can comprise detaching the lens from the first mold portion. The retaining wall can define a perimeter such that the lens is located within the perimeter when the puck assembly supporting the lens is immersed in the liquid. The retaining wall can extend around a portion of the circumference of the flanges of the mold portion. For example, the retaining wall can surround the perimeter of a mold portion supported in a recess of the carrier puck. Thus, the retaining wall can surround the perimeter of a lens carried by the puck assembly. It will be understood that it is not necessary for the wall to extend continuously around the lens—the wall can include one or more gaps provided the dimension of the gaps are such that the lens cannot pass through. As discussed above, the delensing step can involve immersing the carrier puck including a mold portion carrying a lens in a liquid. Use of puck element including a retaining wall can reduce the degree of movement of the lens when detached from the mold. Thus, use of a puck element including a retaining wall can assist in maintaining batch integrity. Additionally or alternatively, use of a puck element including a retaining wall can facilitate the use of robotic handling devices as the retaining wall assists in maintaining the lens in a known location. Additionally or alternatively, use of a puck element including a retaining wall can prevent the lens being damaged as a result of floating loose within the tank.

It can be that a fourth type of step-specific puck element is arranged and configured to displace a blister relative to a carrier puck when the step-specific element is combined with the carrier puck. It can be that a step-specific puck element is arranged and configured to displace a blister away from the surface of the carrier puck. Thus, a step-specific puck element can be arranged and configured to lift a blister away from the surface of the carrier puck and the corresponding manufacturing step can comprise packaging the lens. As discussed above, the packaging step can include sealing a lens within a blister pack. The sealing process can involve the application of substantial amounts of heat and/or force to the pack. Thus, the step-specific element can reduce the risk of damage to the (reusable) carrier puck as a result of the heat or force involved in sealing the blister back. It will be understood that the dimensions of a blister can differ substantially from those of a lens, mold portion or mold assembly. Consequently, a step-specific puck element arranged and configured to displace a blister can differ substantially in form from a step-specific element arranged and configured to displace, for example, a mold portion.

A single step-specific puck element can interact with a plurality of carrier pucks simultaneously. For example, during the hydration and/or extraction step a plurality of carrier pucks can be stacked on a single step-specific puck element which includes a projecting wall. In this case the projecting wall can traverse a hole (recess) in each of the carrier pucks so that the carrier pucks remain aligned in the stack.

According to an aspect of the invention there can be provided a carrier puck suitable for use as the carrier puck of the first aspect.

According to an aspect of the invention there can be provided a puck set including a carrier puck and a plurality of step-specific puck elements, wherein the carrier puck is arranged and configured to interface with a first step-specific puck element and a second, different, step-specific puck element such that, in use, the first step-specific puck element may interact with a first mold portion and/or a lens produced using the mold portion and carried by the carrier puck during a first ophthalmic lens manufacturing step and the second step-specific puck element may interact with the mold portion and/or the lens carried by the puck during a second ophthalmic lens manufacturing step. It will be understood that the first and second steps can be carried out sequentially. The puck set can include further step-specific puck elements which interact with the mold portion and/or lens carried by the puck during further ophthalmic lens manufacturing steps.

According to an aspect of the invention there can be provided a production line for producing MTO lenses including at least two of the following ophthalmic lens manufacturing stations:
 a. A mold assembly station
 b. A curing station
 c. A demolding station
 d. A delensing station
 e. A hydrating station
 f. An extraction station
 g. An inspection station
 h. A packaging station
wherein a single carrier puck is used to transfer a mold portion and/or a lens produced using the mold portion between the at least two manufacturing stations. The production line can include more than two of the manufacturing stations a. to h., for example three, four, five, six or all of the manufacturing stations a. to h. The production line can include other manufacturing stations in addition to manufacturing stations a. to h.; for example the production line can include further, intermediate, manufacturing stations. The production line can include a mold machining station.

Using the same carrier puck to transfer a lens and/or mold portion between manufacturing stations can assist in maintaining batch integrity. The lens production line can include more than three ophthalmic lens manufacturing stations and the same carrier puck can be used to transfer a lens and/or mold portion used to produce the lens between each of the lens manufacturing stations of the line. It can be that the carrier puck is arranged and configured to carry only one mold portion and/or one lens produced using a mold portion at a time.

Each manufacturing station can include apparatus arranged and configured to perform the corresponding manufacturing step. Thus, the mold assembly station can include apparatus arranged and configured to assemble the first mold portion and second mold portion into a mold assembly including a lens-defining cavity containing a lens precursor material. The curing station can include apparatus arranged and configured to cure the lens precursor material in the mold assembly to form a lens. The demolding station can include apparatus arranged and configured to separate the mold assembly such that the lens remains attached to the first mold portion. The delensing station can include apparatus arranged and configured to detach the lens from the first mold portion. The extraction station can include apparatus arranged and configured to extract unwanted material from the lens. The hydration station can include apparatus arranged and configured to hydrate the lens. The inspection station can include apparatus arranged and configured to inspect the lens, for example for defects and/or the cosmetic appearance of the lens. The packaging station can include apparatus arranged and configured to package the lens.

The mold machining station can include apparatus arranged and configured to remove material from a first surface of the mold portion blank.

FIG. 1 shows an overview flow chart of a manufacturing process for producing a Made To Order (MTO) contact lens using a machined mold portion. The process comprises a step of providing two mold halves 100, a fill-and-close step 101, a curing step 102, a mold separation step 104 (demolding step), a step of removing the lens from the mold 106 (delensing step), an extraction step 108, a hydrating step 110, an inspection step 111 and a packaging step 112.

Figure 2:
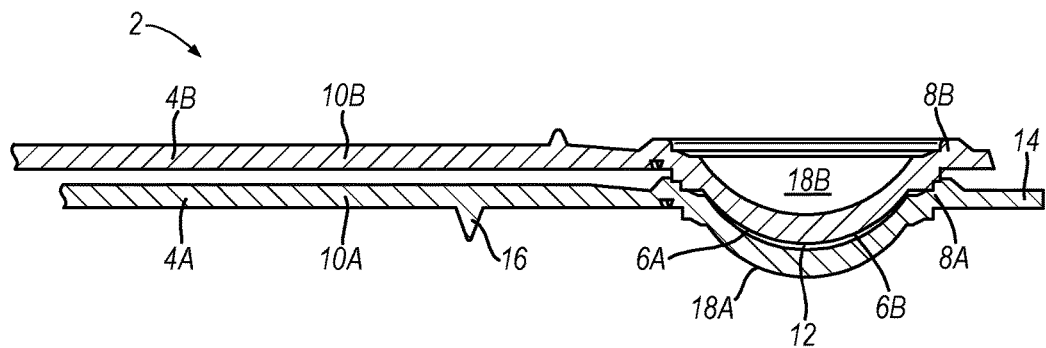
FIG. 2 is a cross-sectional view of a mold assembly in accordance with the first example embodiment.

FIG. 2 shows a cross-sectional view of a mold assembly 2 for use in the present invention. The mold assembly 2 comprises two mold portions 4: one female mold portion 4A and one male mold portion 4B. Both mold portions 4 are pan-handle mold portions. Each mold portion 4 has a lens-defining surface 6 which is circular when viewed in plan. The lens-defining surface 6 of each mold portion 4 is circumscribed by a flange 8. A handle 10 extends radially from the flange 8 of each of the mold portions 4 at a first circumferential position. The female mold portion 4A has a concave lens-defining surface 6A. The male mold portion 4B has a convex lens-defining surface 6B. The male mold 4B is located on top of the female mold 4A such that the concave lens-defining surface 6A and the convex lens-defining surface 6B together form a lens-defining cavity 12. A tab 14 extends radially from the flange 8 of the female mold portion 4A at a second circumferential position, opposite the first circumferential position. The handle 10B of the male mold portion 4B is located above and extends parallel to the handle 10A of the female mold portion 10A. A projection 16 on the handle 10A of the female mold portion 4A extends perpendicular to the longitudinal axis of the handle 10A of the female mold portion 4A and away from the handle 10B of the male mold portion 4B. The mold portions 4 of the mold assembly are stackable mold portions. In this example, each mold portion 4 also includes a second lens-defining surface 18 located on the opposite side of the mold portion 4 to the lens-defining surface 6 which defines the lens-defining cavity 12 of the mold assembly 2.

Figure 3:
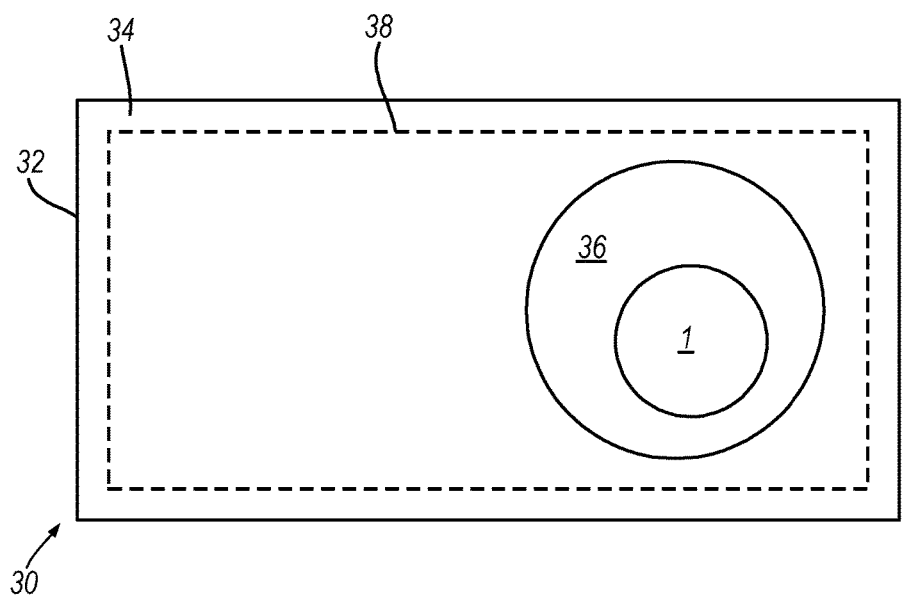
FIG. 3 is a schematic plan view of a blister pack in accordance with the first example embodiment.

FIG. 3 shows a schematic plan view of a blister pack 30 containing a lens 1. The pack comprises a plastic blister 32 having a substantially rectangular planar portion 34 with a lens-receiving recess 36, which appears circular when viewed in plan, formed therein. The recess 36 is sealed with a foil layer (the extent of which is denoted by a dashed line 38 in FIG. 3) which extends across the surface of the rectangular planar portion 34. The lens 1 sits within the recess 36 which also contains packaging saline (not shown).

Figure 4:
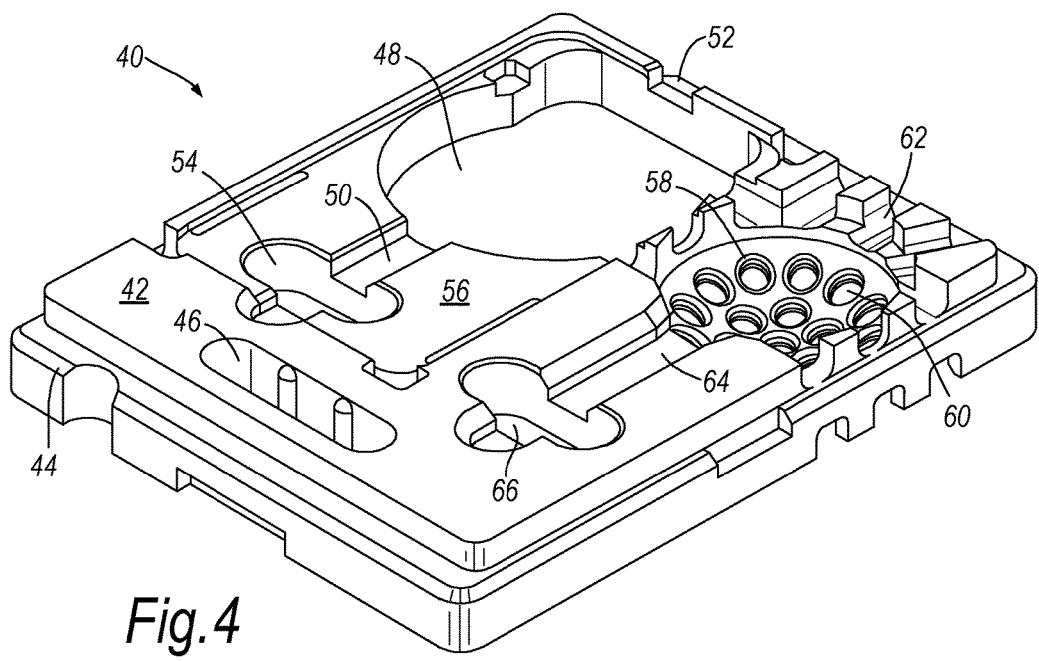
FIG. 4 is an isometric top view of a carrier puck in accordance with the first example embodiment.

FIG. 4 shows an isometric view of a carrier puck 40 in accordance with the present invention. The carrier puck 40 has a rectangular top surface 42 surrounded by a rim 44. The top surface 42 includes a groove 46 near a first end of the puck 40 in which an RFID tag (not shown) can be located. A large opening 48 is located in one corner of the carrier puck 40 at the opposite end of the puck to the RFID-groove 46. A handle-receiving indentation 50, sized and shaped to receive a pan-handle mold handle (not shown) extends parallel to the edge of the puck from a first location on the perimeter of the large opening 48. A tab-receiving indentation 52 sized and shaped to receive the tab of a female mold (not shown) extends away from a second location on the perimeter of the large opening 48, opposite to the first location and forms a gap in the rim 44 of the carrier puck. A first oval or rounded rectangular hole 54 extends across the handle-receiving indentation 50 perpendicular to the longitudinal axis of the handle-indentation in the region of the distal end of the handle-receiving indentation. Encompassing the large opening 48 and handle-receiving indentation 50 is a rectangular blister-receiving recess 56 sized and shaped to receive a blister pack (not shown). In the other corner of the carrier puck 40, at the opposite end of the puck to the RFID groove 46, a hydration dish 58 is provided. The hydration dish 58 is circular when viewed in plan and comprises a concave recess with a plurality of holes 60 formed in the surface of the recess and extending through the depth of the puck 40 creating a sieve-like structure. A plurality of drainage grooves 62 are formed in the top surface 42 and extend from the perimeter of the hydration dish to the edge of the surface. A second handle-receiving indention 64, also sized and shaped to receive a pan-handle mold handle (not shown) extends from the edge of the hydration dish 58 parallel to the first handle-receiving indentation 50. A second oval or rounded rectangular hole 66 extends across the handle-receiving indentation 64 perpendicular to the longitudinal axis of the indentation.

In use a portion of a step-specific puck element (not shown) can be inserted into the large opening 48 to contact a first mold portion having its handle and tab supported in the first handle-receiving recess 50 and the tab-receiving recess 52. An RFID tag in RFID-groove 46 can be used to track the progress of the carrier puck 40 and thereby to track any associated mold portion and/or lens during the manufacturing process.

Figure 5:
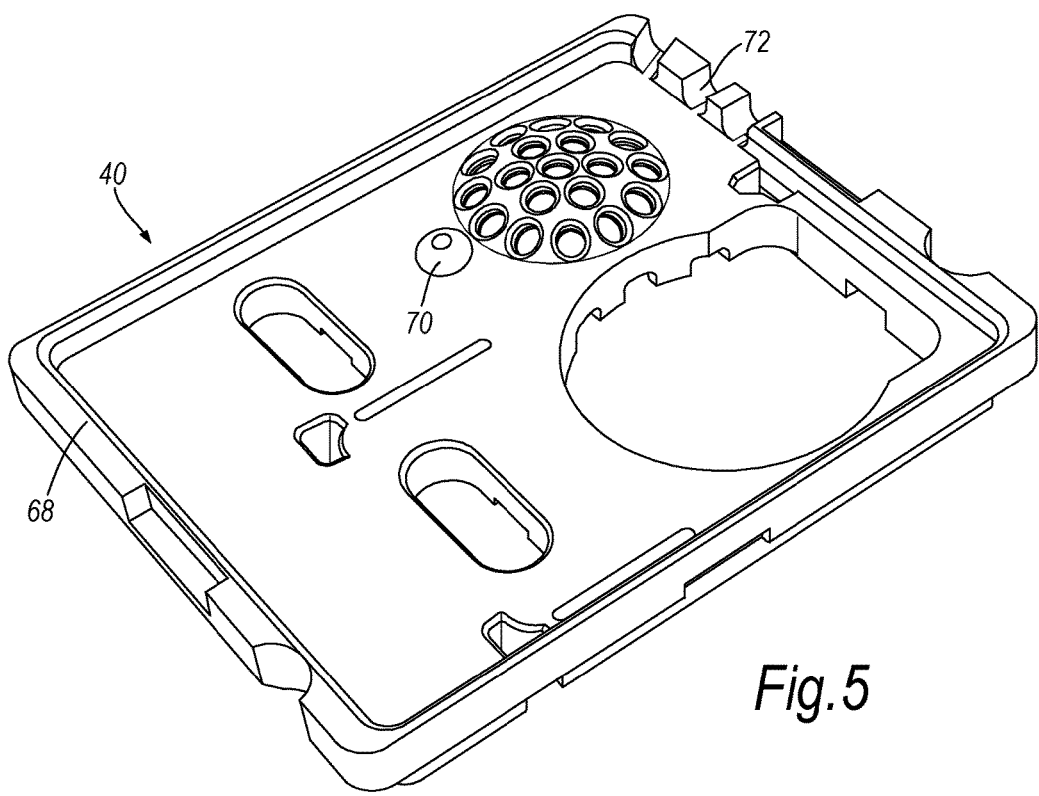
FIG. 5 is an isometric bottom view of the carrier puck of FIG. 4.

FIG. 5 shows an isometric view of the rear surface of a carrier puck 40 in accordance with the invention. The rear surface is surrounded by a rim 68. The rear surface includes a dimple 70 which is located inboard of the hydration dish. A plurality of gaps 72 are present in the region of the rim 68 adjacent to the hydration dish 58.

Figure 6:
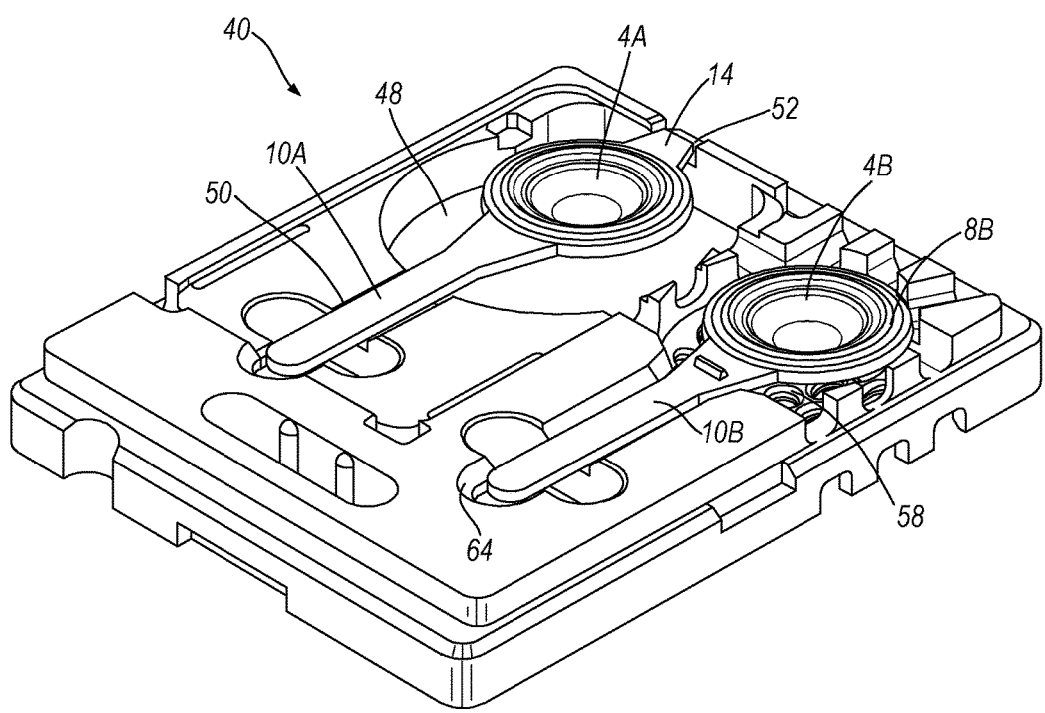
FIG. 6 is an isometric view of the carrier puck and mold portions in an initial configuration in accordance with the first example embodiment.

FIG. 6 shows the carrier puck 40 and mold portions 4 in the initial configuration when the male mold portion 4B, female mold portion 4A, and RFID tag (not shown) have been located (step 100d in FIG. 12) in the carrier puck. The two mold portions 4 lie side by side with their handles 10 extending parallel to one another. The tab 14 and handle 10A of the female mold portion 4A lie in their respective recesses 50, 52, thus the head of the female mold portion 4A is suspended above the large hole 48. The male mold portion 4B is placed over the hydration dish 58 such that the handle 10B of the male portion 4B lies in the second handle-receiving indentation 64 and the flanges 8B of the male mold portion 4B rest on the rim of the hydration dish 58.

Figure 7:
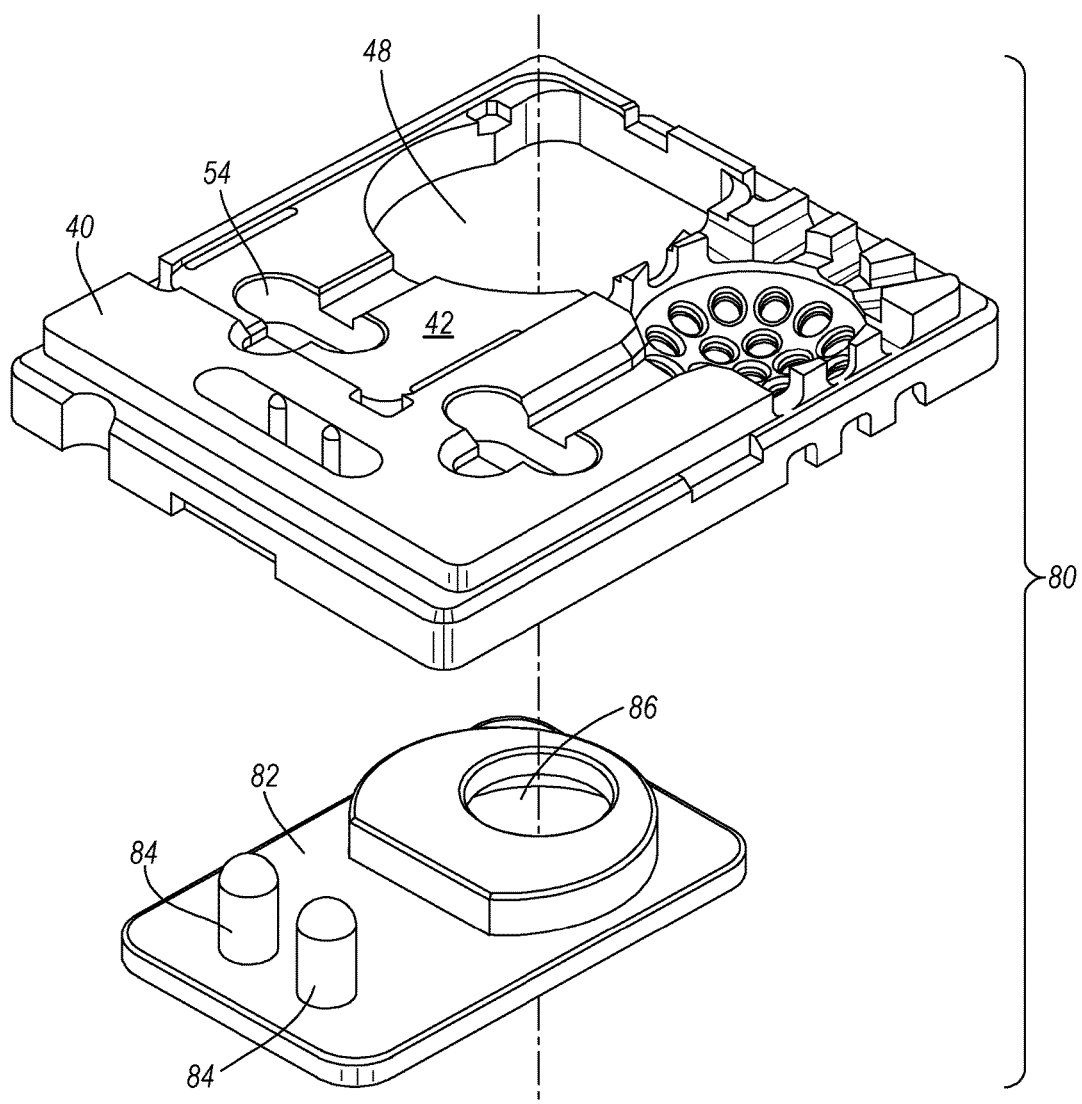
FIG. 7 is an exploded view of the puck assembly in a fill-and-close configuration in accordance with the first example embodiment.

FIG. 7 shows an exploded view of a puck assembly 80 including the carrier puck 40 and a step-specific puck element (mold location anvil 82) in a fill-and-close configuration. The mold location anvil 82 is located on the rear side of the carrier puck 40 such that a portion of the anvil extends into the large opening 48. The mold location anvil 82 includes two upright pins 84 which extend upwards from the base of the anvil through the first oval groove 54 such that the distal ends of the pins 84 are above the top surface 42 of the carrier puck 40 and extend either side of the first handle-indentation 50. The portion of the anvil 82 that extends through the large opening 48 includes a head-receiving indentation 86 sized and shaped to receive the back (i.e. the underside) of the head of a female mold portion 4A.

In use, the back of a mold assembly (i.e. the back of the female mold portion 4A, as described in FIG. 2) sits in the head-receiving indentation 86. The handles 10A, 10B of the two molds 4 forming the mold assembly sit between the pins 84 which function both to locate the mold location anvil 82 relative to the carrier puck 40 and to ensure the mold assembly 2 is in the correct orientation. During assembly of a mold assembly 2, the upright pins 84 serve to guide the handle 10 of the male mold portion 4B such that the handles 10 of the male and female mold portions 4A, 4B are in alignment. The process of joining the two mold portions 4 together involves exerting considerable force onto the mold portions 4. The recess 86 provided in the mold support portion of the mold location anvil 82 supports the female mold portion 4A (in particular the flange 8 thereof) during that process, ensures that the mold portion 4 remains in a flat position and also helps to prevent flexing of the carrier puck 40.

Figure 8:
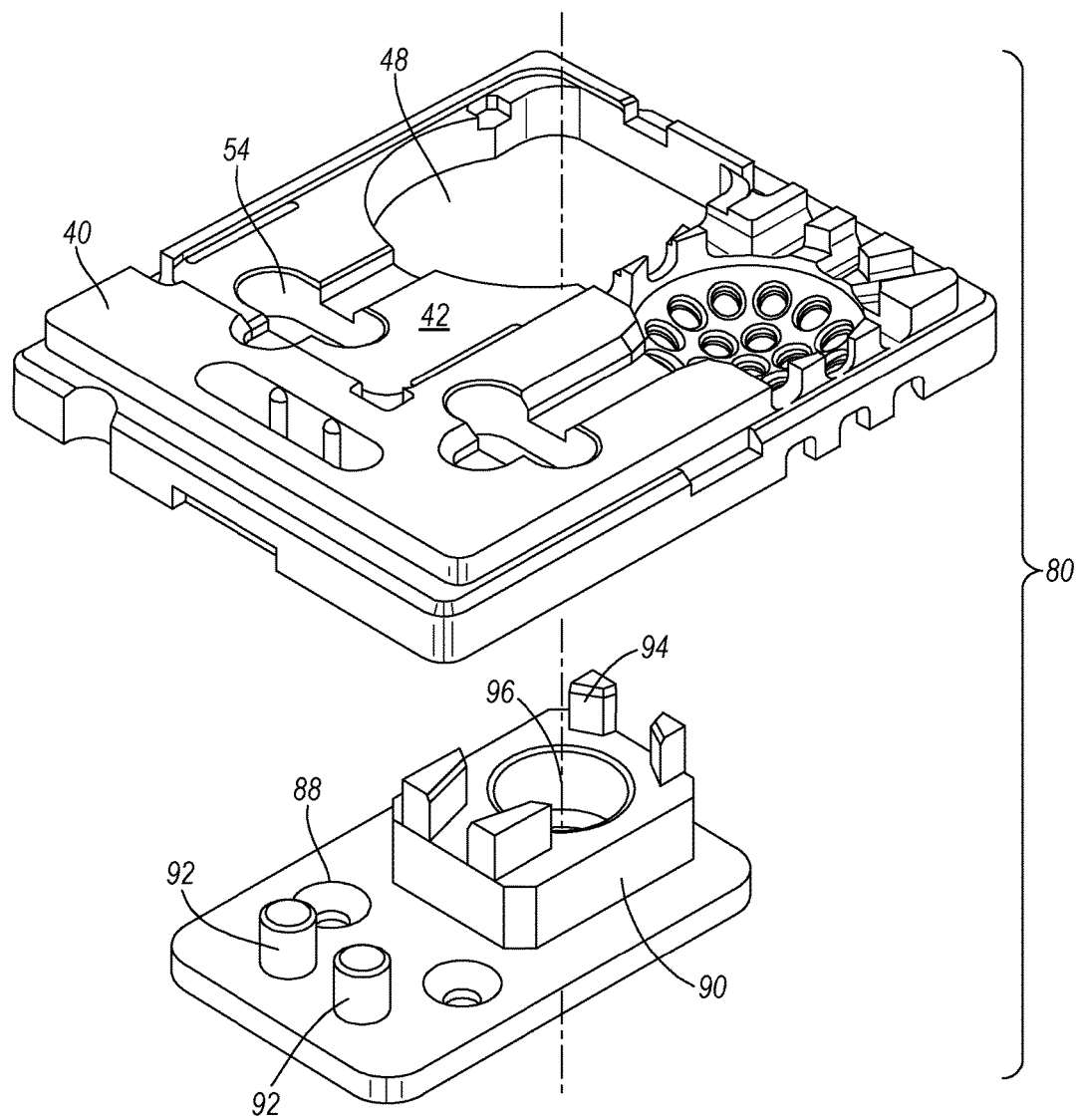
FIG. 8 is an exploded view of the puck assembly in a demolding configuration in accordance with the first example embodiment.

FIG. 8 shows an exploded view of the puck assembly 80 including the carrier puck 40 and a step-specific puck element (demolding anvil 88) in a demolding configuration. The demolding anvil 88 is located on the rear side of the carrier puck 40. The demolding anvil 88 comprises a flat planar portion supporting a demolding nest 90 and two upright pins 92. The demolding nest 90 extends through (traverses) the large opening 48 such that the top surface of the nest 90 projects beyond the top surface 42 of the carrier puck 40. The top surface of the nest 90 extends in a plane parallel to the top surface 42. The top surface of the nest 90 includes four locating projections 94. The surface of the nest 90 also includes a recess 96 sized and shaped to receive the back of the head of a female mold portion 4A (see FIG. 2). The two upright pins 92 on the anvil 88 extend upwards into the first oval groove 54 and their ends are flush with the surface 42 of the carrier puck 40.

In use, prior to the engagement of the demolding anvil 88 with the carrier puck 40, a mold assembly 2 (as shown in FIG. 2) is supported by the tab 14 and handle 10A of a female mold portion 4A which are located in the tab 52 and first handle-receiving recess 50 respectively. When the demolding anvil 88 is engaged with the carrier puck 40 the demolding nest 90 lifts the head of the mold assembly 2 clear of the surface of the puck 42 and level with the splitter blades of a demolding station (see FIG. 11 and associated description). The back of the mold assembly 2 (i.e. the back of the female mold portion 4A) sits in the recess 96 in the surface of the nest such that the locating projections 94 ensure the mold assembly 2 remains in place.

Figure 9:
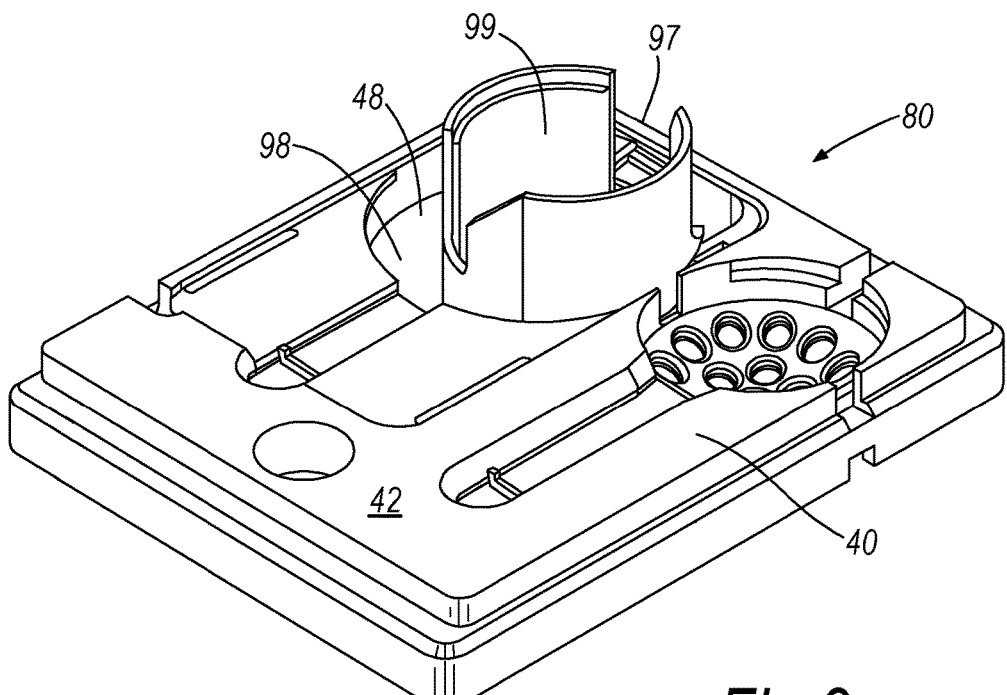
FIG. 9 is an exploded view of the puck assembly in a soaking configuration in accordance with the first example embodiment.

FIG. 9 shows the puck assembly 80 including the carrier puck 40 and a step-specific puck element (soaking atoll 98) in a soaking configuration. The soaking atoll 98 is located on the rear side of the carrier puck 40. The soaking atoll 98 comprises a substantially planar portion and two circumferential walls 99. The circumferential walls 99 project perpendicular to the planar portion and extend through the large opening 48 and beyond the front surface 42. The two walls 99 are substantially symmetrical and together define a circular cylinder with two gaps 97 in the circumference.

In use, a female mold portion 4A (as shown in FIG. 2) occupies the same position with respect to the carrier puck 40 as in the initial configuration of FIG. 6. No male mold portion 4B is present at this stage, as it has been disposed of. The walls 99 enclose the head of the mold portion 4A and the two gaps 97 in the circular cylinder defined by the walls 99 are aligned with the tab 14 and handle 10A of the female mold portion 4A. When the puck assembly 80 supporting a mold portion 4A is placed in a soaking tank the distal ends of the circumferential wall 99 will break the surface of the soaking liquid and retain the lens 1 (see FIG. 3) when it detaches from the surface of the female mold portion 4A.

Figure 10:
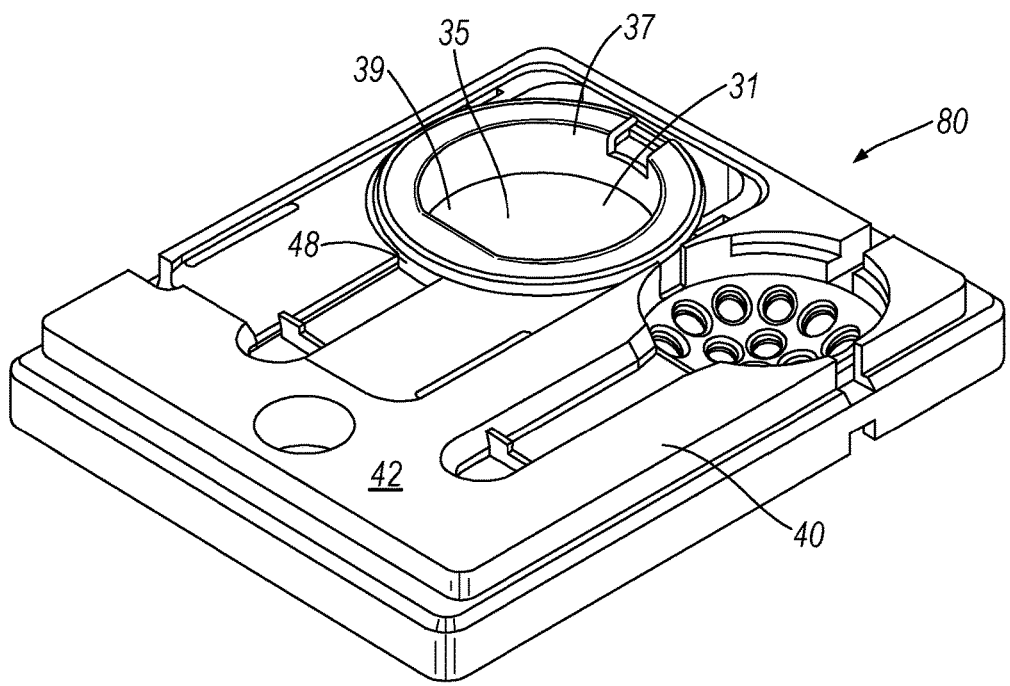
FIG. 10 is an exploded view of the puck assembly in a blister-seal configuration in accordance with the first example embodiment.

FIG. 10 shows the puck assembly 80 including the carrier puck 40 and a step-specific puck element (blister anvil 31) in a blister-seal configuration. The blister anvil 31 comprises a substantially planar portion 33 and a blister nest 35. The blister nest 35 comprises a wall 37 projecting from the planar portion and surrounding a hole 39 (extending through the depth of the blister anvil) corresponding to the truncated-circle plan form of the rear of a blister (not shown). The outer circumference of the wall 37 is circular. The inner edge of the wall 37 mirrors the shape of the truncated circular hole 39 (i.e. the wall has a non-constant thickness). The blister nest 35 extends through the large opening 48 and beyond the surface 42 of the puck 40.

In use, before the blister anvil 31 is combined with the carrier puck 40, a blister 32 (as shown in FIG. 3) sits in the blister recess 56 of the carrier puck 40. When the carrier puck 40 is combined with the puck element 31 the blister 32 is displaced away from the surface 42 of the carrier puck 40 by the wall 37. The recess 36 of the blister 32 sits in the hole 39. Lifting the blister 32 away from the surface 42 of the carrier puck 40 protects the carrier puck 40 from the substantial amounts of heat generated during the blister seal process. The shape of the wall 37 and hole 39 serves to hold the blister 32 in place during the sealing process.

Figure 11:
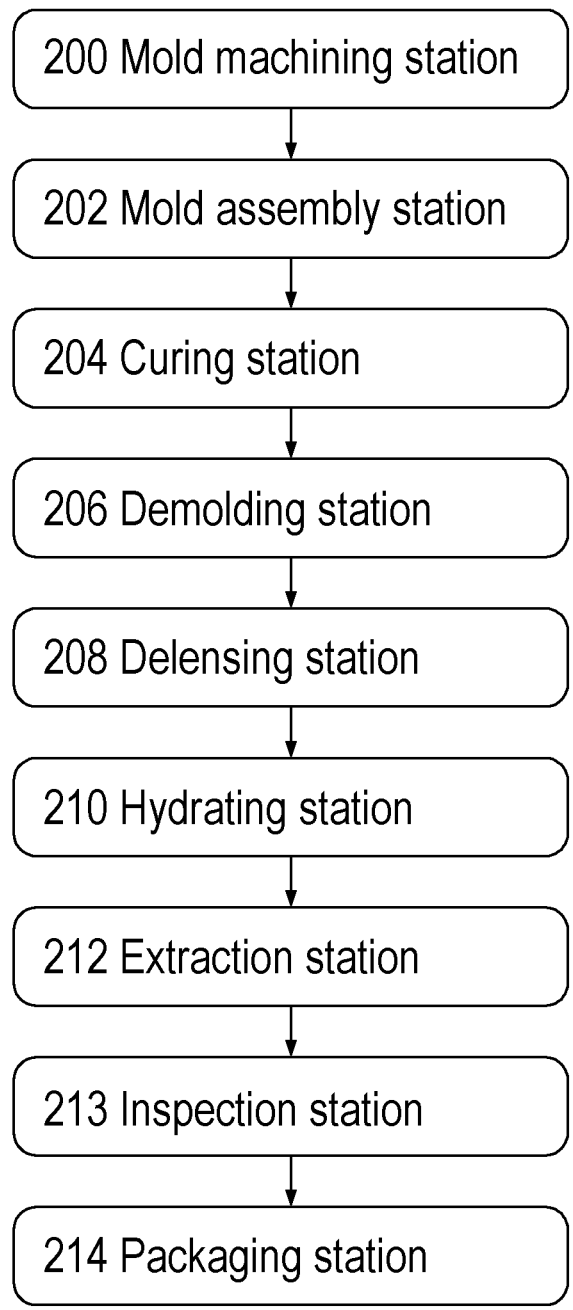
FIG. 11 is a schematic representation of a MTO production line in accordance with a further example embodiment of the present invention.

FIG. 11 shows a schematic representation of a production line for MTO ophthalmic lenses. The line includes a mold machining station 200, a mold assembly station 202, a curing station 204, a demolding station 206, a delensing station 208, a hydrating station 210, an extraction station 212, an inspection station 213 and a packaging station 214.

Figure 12:
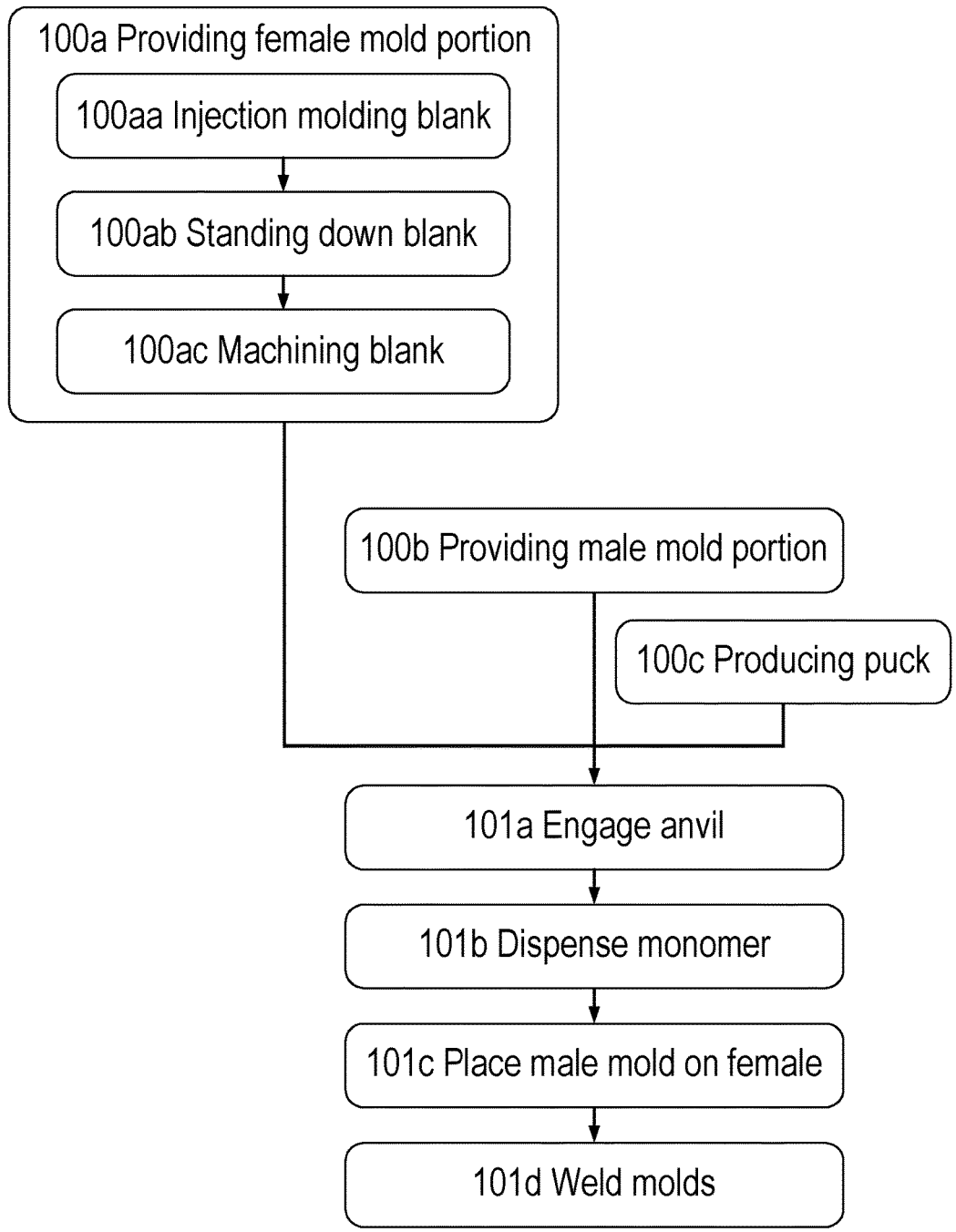
FIG. 12 is a flow chart of the process for providing a mold assembly containing lens precursor material on a carrier puck, in accordance with the process shown in FIG. 1, in more detail.

FIG. 12 shows in more detail a flow chart of the mold production process 100 and fill-and-close process 101 (see FIG. 1), which two steps result in a mold assembly 2 (as shown in FIG. 2) containing lens precursor material on a carrier puck 40 (as shown in FIG. 4). The mold production process 100 comprises a step of providing 100a a female mold portion 4A. Providing 100a a female mold portion 4A includes producing a lens mold portion blank made from a plastic material and machining the blank to remove a portion of the blank to form a concave lens-defining surface 6b. Producing a lens mold portion blank from a plastic material includes injection molding 100aa a lens mold blank and standing-down 100ab the blank for a period of about 24 hours to allow settling/shrinkage of the mold. Machining the blank 100ac includes machining the mold to produce the required lens geometry. The process also comprises a step of providing 100b a male lens mold portion 4B. The step of providing a male lens mold portion 100b includes injection molding a lens mold blank and standing-down the blank for a period to allow settling/shrinkage of the mold. The process also comprises a step of producing 100c a carrier puck 40 using an additive manufacturing process. Once the female mold portion 4A, male mold portion 4B and carrier puck 40 have been provided/produced (100a, 100b, 100c) the fill-and-close process 101 may begin. At the start of the fill-and-close process 101 the female and male mold portions 4A, 4B are arranged on the puck 40 in the initial configuration of FIG. 6. An RFID tag (not shown) is located in the RFID-groove 46. A mold location anvil 82 (as shown in FIG. 7) is engaged 101a with the carrier puck 40. Liquid monomer is dispensed 101b into the female mold portion 4A. The volume of liquid monomer to be dispensed is determined by scanning the RFID tag and looking up the corresponding volume in a look-up table. The male mold portion 4B is placed 101c on top of the female mold portion 4A containing the liquid monomer resulting in a mold assembly 2 as shown in FIG. 2 supported by the carrier puck 40. The carrier puck 40 and the mold location anvil 82 are in the fill-and-close configuration of FIG. 7. The female and male mold portions 4A, 4B are then joined 101d together by welding.

Figure 13:
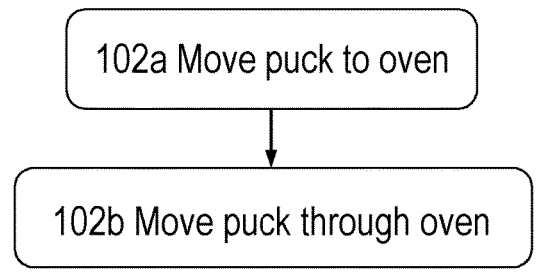
FIG. 13 is a flow chart of the curing step, in accordance with the process shown in FIG. 1, in more detail.

Returning to FIG. 1, once the mold assembly 2 (as shown in FIG. 2) containing lens precursor material has been provided on the carrier puck 40 (as shown in FIG. 4), the material is then cured 102. FIG. 13 shows the curing step in more detail. After the mold location anvil 82 (as shown in FIG. 7) has been removed from the puck assembly 80, the carrier puck 40 including the mold assembly 2 is moved 102a to a curing station 204 (see FIG. 11) The puck assembly 80 is moved 102b through the curing oven where it is cured by being exposed to UV light.

Figure 14:
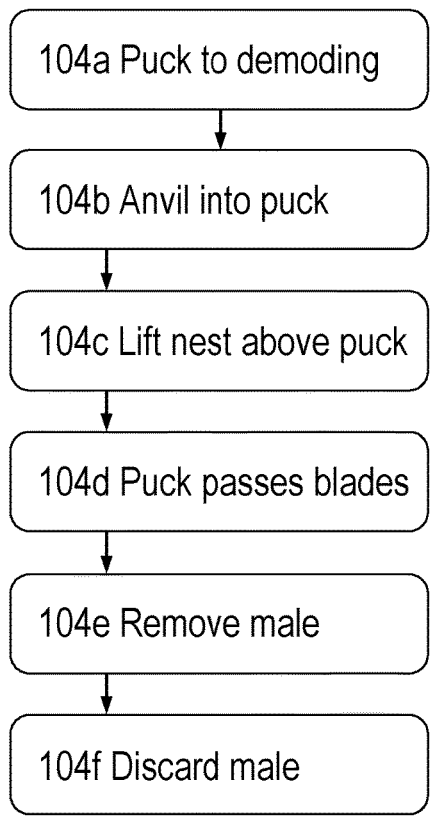
FIG. 14 is a flow chart of the demolding step, in accordance with the process shown in FIG. 1, in more detail.

Returning to FIG. 1, once the material contained within the mold assembly 2 (as shown in FIG. 2) has been cured 102 the mold portions must be separated (demolded) 104. FIG. 14 shows the demolding step in more detail. The puck assembly 80 including the carrier puck 40 (as shown in FIG. 4) and the mold assembly 2 containing the cured lens 1 is moved 104A to a demolding station 206 (see FIG. 11). A demolding anvil 88 (as shown in FIG. 8) is located beneath the large opening of the carrier puck 48 when the puck 40 is in the demolding station 206. The demolding anvil 88 is moved 104B relative to the carrier puck 40 until the upright pins 92 on the demolding anvil 88 engage the first oval groove 54 and the surface of the demolding nest 90 and locating projections 94 engage the mold assembly 2 and lift 104c it clear of the surface of the carrier puck 42 such that the mold assembly 2 is level with the splitter blades (not shown) of the demolding station 206. Thus, the puck assembly 80 is in the demolding configuration of FIG. 8. The puck assembly 80 (including the carrier puck 40 and the demolding anvil 88) which supports the mold assembly 2 is then moved 104d relative to the splitter blades such that the blades cut the mold assembly 2 and disconnect 104e the male mold portion 4B from the mold assembly 2. The lens 1 remains in the female mold portion 4A and the male mold portion 4B is discarded 104f.

Figure 15:
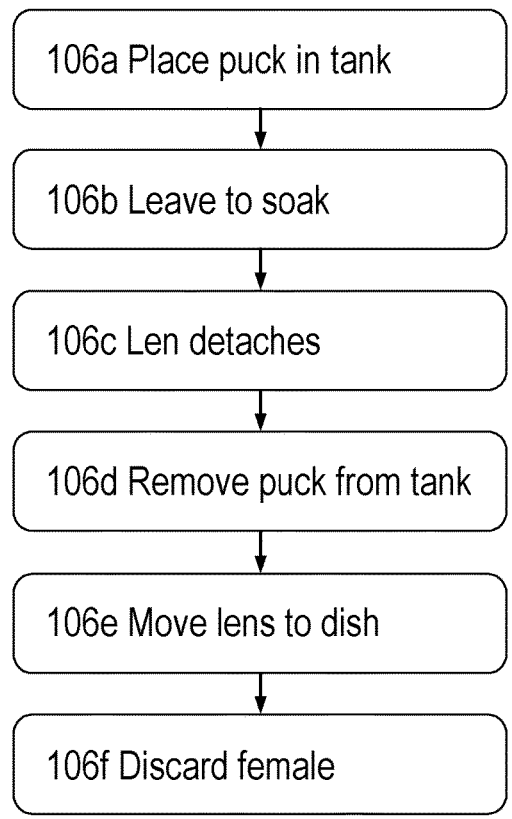
FIG. 15 is a flow chart of the delensing step in, in accordance with the process shown in FIG. 1, in more detail.

Returning to FIG. 1, after the mold portions 4A, 4B (as shown in FIG. 2) have been separated 104 the lens 1 must be removed 106 from the female mold portion 4A (delensing). FIG. 15 shows the delensing process 106 in more detail. The puck assembly 80 (as shown in FIG. 9), including the carrier puck 40, supporting the female mold portion 4A containing the lens 1 is placed 106a in a soak tank at a delensing station 208 (see FIG. 11) such that the walls 99 of a soaking atoll 98 traverse the large opening 48 of the carrier puck 40. The carrier puck 40 is then left to soak 106b in the tank until the lens 1 detaches 106c from the female mold 4A. The puck 40 is then removed 106d from the tank and the released lens 1 is picked up and placed 106e in the hydration dish 58 by a robot arm. The female mold portion 4A is then discarded 106f.

The walls 99 of the soaking atoll 98 help retain the lens 1 in the vicinity of the mold 4A when the lens 1 becomes detached from the female mold portion 4A.

Returning to FIG. 1, when the delensing process 106 is complete the lens 1 located in the hydration dish 58 (see FIG. 4) of the carrier puck 40 undergoes extraction 108, hydration 110 and inspection 111 before being packaged 112.

FIG. 16 shows the extraction process 108 in more detail. The carrier puck 40 (as shown in FIG. 4) containing the lens 1 in the hydration dish 58 is moved 108a to an extraction station 210 (see FIG. 11). The carrier puck 40 supporting the lens 1 is stacked 108b with other carrier pucks, each carrier puck supporting a single lens. Solvent is passed over 108c the stack of carrier pucks in order to remove unreacted monomer. The rim 44 of the carrier puck 40 facilitates stacking of the carrier pucks 40. The dimple 70 on the back of a given carrier puck 40 helps maintain the lens 1 carried by the carrier puck below the given puck 40 in the stack in the region of hydration dish 58.

FIG. 17 shows the hydration process 110 in more detail. The stack of carrier pucks including the carrier puck 40 carrying the lens 1 is moved 110a to a hydration station 212 (see FIG. 11). Water is passed over 110b the stack such that the lens 1 is hydrated.

In the inspection process 111, the carrier pucks are separated from the stack. Each carrier puck 40 carrying a hydrated lens 1 is moved to an inspection station 213. The lens is inspected for cosmetic defects in a manner well known in the art.

FIG. 18 shows the packaging process 112 in more detail. The puck assembly 80 supporting the lens 1 is moved 112a to a packaging station 214 (see FIG. 11). A blister anvil 31 (as shown in FIG. 10) is located beneath the large opening 48 of the carrier puck 40 when the puck is in the packaging station 214. An empty blister 32 (see FIG. 3) is placed 112b in the blister-receiving recess 56 (which recess 56 encompasses the large opening 48) of a carrier puck 40. Saline is dispensed 112c into the lens-receiving recess 36 of the blister 32. The lens 1 is transferred 112d into the recess 36 of the blister 32 from the hydration dish 58. The blister anvil 31 engages 112e the carrier puck 40 from beneath such that the blister 32 is lifted away from the surface of the carrier puck 42. A foil lid 38 is heat-sealed 112f onto the blister 32. The RFID tag is checked 112g, the blister pack 30 is labelled 112h accordingly and then removed 112i from the puck 40. The carrier puck 40 is returned to the start of the production line, for re-use.

The blister anvil 31 lifts the blister 32 away from the surface of the puck 42 such that the heat applied to the blister 32 during the sealing process 112f does not damage the carrier puck 40 and the puck can therefore be reused.

Either the female mold portion 4A or the MTO lens 1 produced using the mold portion 4A remains with the carrier puck 40 (and therefore with its associated RFID tag) throughout the process described above, up until the filled blister pack 30 containing the lens 1 has been labelled 112h. Consequently, as well as providing a number of features which assist with mechanical/physical aspects of the manufacturing process, the carrier puck also helps to ensure batch integrity.

In one embodiment the mold can be made from Nichigo G-polymer (an amorphous vinyl alcohol-based resin) which is water soluble. The process is as described above, with the exception that delensing step is achieved by submerging the head of a female mold portion in water until it dissolves.

Whilst the present invention has been described and illustrated with reference to particular embodiments, it will be appreciated by those of ordinary skill in the art that the invention lends itself to many different variations not specifically illustrated herein.

For example, in the process described above the female mold portion is machined while the male mold portion is cast molded. It can be that the male mold portion only, or both the female and male mold portions, or neither of the mold portions are machined.

The sequence of steps described above are an example of a lens manufacturing process and the skilled person will understand that many variants are possible. For example, the steps may be carried out in a different order from that described herein. Steps may be combined with other steps (for example, demolding and delensing can be combined in processes in which the lens is removed from a mold pair by dissolving the mold pair). Two or more steps may be carried out at a single station. In some processes, one or more of the steps can be omitted entirely. In some processes, additional steps are included in the process. However, in accordance with the claims set out below, the puck assembly supports at least one of the first mold portion and the lens during at least two of ophthalmic lens manufacturing steps.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of manufacturing an ophthalmic lens using a first mold portion and a puck assembly, said puck assembly comprising a carrier puck, wherein the puck assembly supports at least one of the first mold portion and the ophthalmic lens during at least two of the following ophthalmic lens manufacturing steps:
  a. assembling the first mold portion and a second mold portion into a mold assembly including a lens-defining cavity containing a lens precursor material;
  b. curing the lens precursor material in the mold assembly to form a lens;
  c. separating the mold assembly such that the lens remains attached to the first mold portion;
  d. detaching the lens from the first mold portion;
  e. extracting unwanted material from the lens;
  f. hydrating the lens;
  g. inspecting the lens;
  h. packaging the lens; and
characterised in that the carrier puck is arranged and configured to interface with a plurality of different step-specific puck elements and the method includes:
  i. providing a first step-specific puck element;
  ii. combining the first step-specific puck element with the carrier puck and carrying out a first ophthalmic lens manufacturing step on the first mold portion and/or the lens carried by the carrier puck; and then
  iii. providing a second step-specific puck element;
  iv. combining the second step-specific puck element with the carrier puck and carrying out a second ophthalmic lens manufacturing step on the first mold portion and/or the lens carried by the carrier puck,
wherein the puck assembly supports at least one of the first mold portion and the lens during the majority of the ophthalmic lens manufacturing steps a. to h.

2. A method according to claim 1, wherein the first mold portion has a lens defining surface and the method includes a step of removing material from a lens mold portion blank to form the lens defining surface of the first mold portion.

3. A method according to claim 1, wherein the method further comprises a step of providing an identifying element and the carrier puck carries the identifying element in all of the ophthalmic lens manufacturing steps of the method.

4. A method according to claim 3, wherein the method comprises a step of reading the identifying element and selecting a process or a process parameter based upon the identity of the first mold portion and/or lens.

5. A method according to claim 3, wherein the identifying element is a Radio Frequency Identity (RFID) tag.

6. A method according to claim 1, wherein the method further comprises providing a third step-specific puck element, combining the third step-specific puck element with the carrier puck, and carrying out a third ophthalmic lens manufacturing step on the first mold portion and/or the lens carried by the carrier puck.

7. A method according to claim 1, wherein the method comprises providing a further step-specific puck element, combining the further step-specific puck element with the carrier puck, and carrying out a further ophthalmic lens manufacturing step on the first mold portion and/or the lens carried by the carrier puck.

8. A method according to claim 1, wherein the first step-specific puck element is arranged and configured to support flanges of the first mold portion and the first manufacturing step comprises assembling the first mold portion and the second mold portion into the mold assembly.

9. A method according to claim 1, wherein one of the step-specific puck elements is arranged and configured to displace the mold assembly away from the surface of the carrier puck and the corresponding manufacturing step comprises separating the mold assembly such that the lens remains attached to the first mold portion.

10. A method according to claim 1, wherein one of the step-specific puck elements comprises a retaining wall arranged and configured to retain the lens in proximity to the first mold portion and the corresponding manufacturing step comprises detaching the lens from the first mold portion.

11. A method according to claim 1, wherein one of the step-specific puck elements is arranged and configured to lift a blister away from the surface of the carrier puck and the corresponding manufacturing step comprises packaging the lens.

12. A method according to claim 1, wherein the step of separating the mold assembly such that the lens remains attached to the first mold portion, the step of detaching the lens from the first mold portion, or both of those steps, comprises dissolving the first mold portion.

13. A method according to claim 1, wherein the method includes a step of manufacturing the puck assembly using an additive manufacturing process.

* * * * *